T. N. SLOCUM.
ELECTRIC STOVE.
APPLICATION FILED AUG. 13, 1915.
1,178,883.
Patented Apr. 11, 1916.
2 SHEETS—SHEET 1.
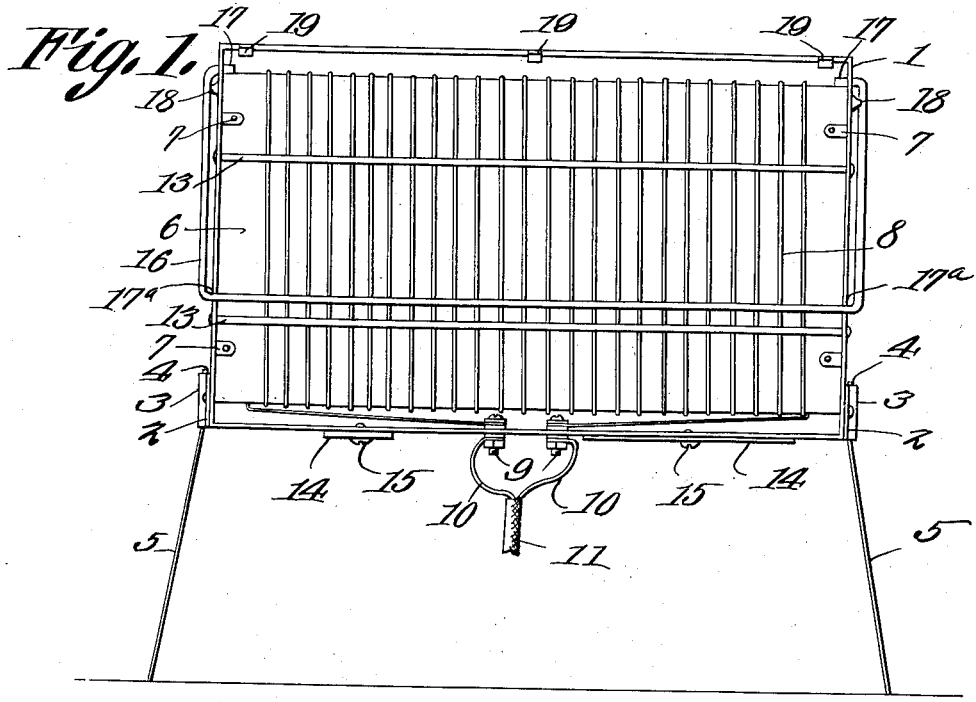
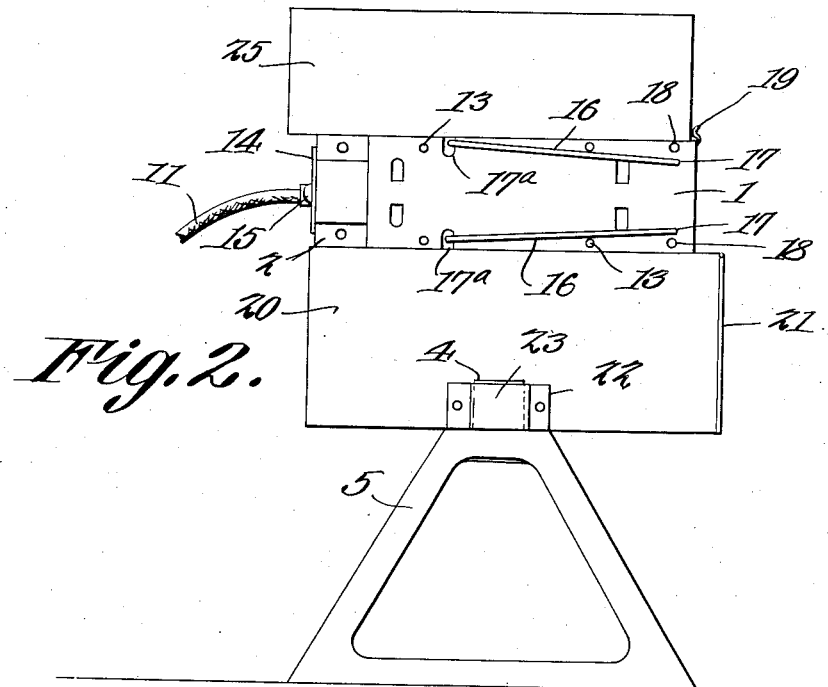
Witnesses
T. N. Slocum, Inventor,
by C. A. Snow & Co.
Attorneys.

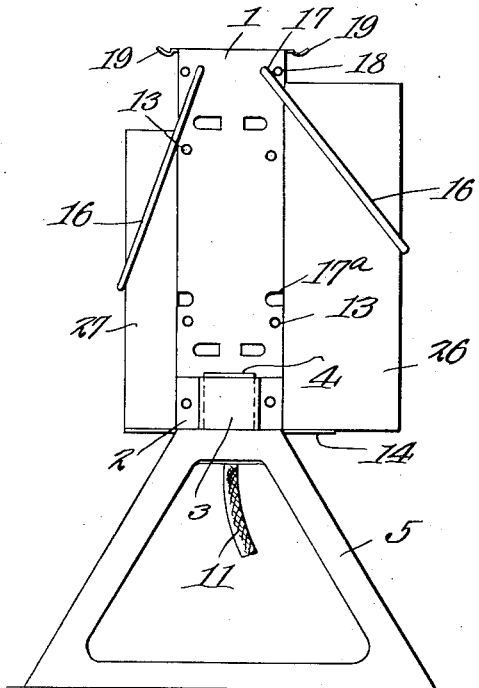
Fig. 3.
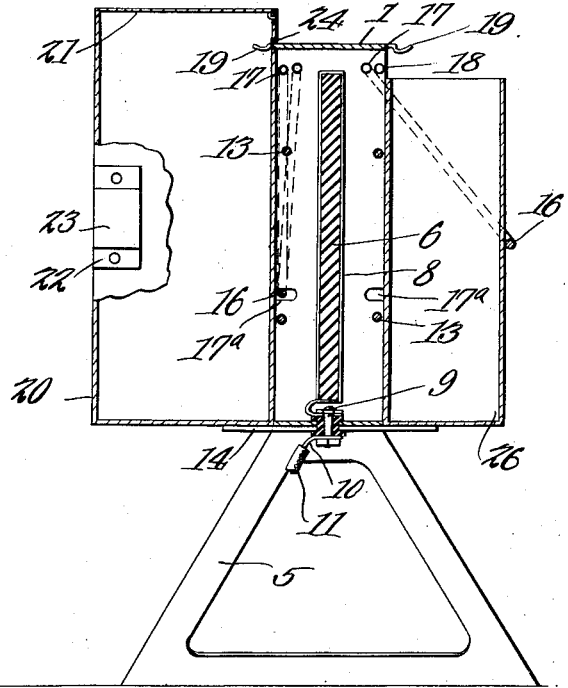
Fig. 4.
Fig. 5.
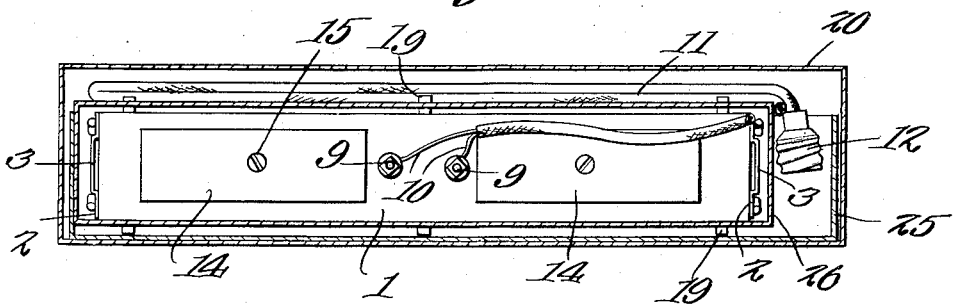

UNITED STATES PATENT OFFICE.

THADDEUS N. SLOCUM, OF ABERDEEN, WASHINGTON.

ELECTRIC STOVE.

1,178,883.

Specification of Letters Patent. Patented Apr. 11, 1916.

Application filed August 13, 1915. Serial No. 45,427.

*To all whom it may concern:*

Be it known that I, THADDEUS N. SLOCUM, a citizen of the United States, residing at Aberdeen, in the county of Chehalis and State of Washington, have invented a new and useful Electric Stove, of which the following is a specification.

The present invention appertains to electric stoves and toasters, and aims to provide a novel and improved device of that character adapted especially for table use and the like, the device being portable and being collapsible so that it can be carried or stored compactly.

One of the main objects of the invention is the provision of an electric heating device of such construction that the heating unit or element may be employed in both vertical and horizontal positions, in order that the best results may be obtained in toasting, boiling, frying, etc.

The present contrivance embodies a heating element or unit, and containers or utensils adapted to be heated thereby, said parts together with the other parts of the device being adapted to be compactly nested together when the device is not in use, and the containers or utensils being adapted to be supported and heated by the heating element or unit when the stove is erected.

Another object of the invention is the provision of an electric heating unit and an oven adapted to coöperate in a novel manner, whereby toast or other edibles may be kept warm within the oven or can be heated or baked therein.

A still further object of the invention is the provision of novel means for holding the toast, containers or other objects upon the sides of the heating unit.

The invention also embodies the provision of legs applicable to either the heating unit or oven, whereby the heating unit may be supported in a vertical position by the legs with the oven, toast, cooking or boiling vessel, or other object upon the side or sides of the heating unit, and whereby the oven may be supported in a horizontal position by the legs so that the heating unit can be supported upon or within the oven for cooking and other purposes.

It is also within the scope of the invention to provide an electric stove having the characteristics above noted and which at the same time, is comparatively simple, light and inexpensive in construction, as well as being thoroughly efficient, practical and serviceable in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of the stove illustrating the heating unit supported in vertical position by the legs. Fig. 2 is an end view of the stove illustrating the oven supported by the legs, and the heating unit supported upon the oven for in turn supporting a frying pan or other utensil thereon. Fig. 3 is an end view of the stove illustrating the heating unit in vertical position, as seen in Fig. 1, and depicting a piece of toast supported at one side of the heating unit and a cooking or boiling vessel supported upon the other side thereof. Fig. 4 is a vertical section of the stove with the heating unit arranged as illustrated in Fig. 3, and illustrating the oven and cooking vessel or utensil upon the opposite sides of the heating unit. Fig. 5 is a sectional view illustrating the several parts of the apparatus nested or fitted together for compact storage or handling.

The heating unit or element embodies a rectangular frame 1 formed from a bar or strip of suitable metal or other material, and this frame 1 is supported in an upright or vertical position, by means of straps 2 riveted or otherwise secured to the ends of the frame 1 adjacent one of the longitudinal pieces of the frame and having upstruck portions 3 forming sockets to receive the upstanding tongues 4 provided at the upper ends of the legs or supports 5. The tongues 4 may be readily slipped into the sockets 3 whereby the heating unit can be supported in an upright position, the legs being detachable as will be apparent. The legs are preferably stamped from sheet metal.

The heating unit embodies a slab or sheet 6 of mica or other suitable insulating material disposed within the frame 1 between the edges thereof, the edges of the slab or sheet 6 being spaced from the longitudinal pieces of the frame, and the ends of the slab or sheet 6 being attached to the ends of the frame. To this end, the ends of the frame 1 are provided with pairs of instruck ears 7 straddling or overlapping the slab or sheet 6 and secured thereto in any suitable manner, whereby the slab or sheet 6 will be supported properly within the frame. A resistance wire or conductor 8 is wound around the slab or sheet 6 and has its terminals attached to a pair of binding posts 9 engaged through and insulated from the longitudinal piece of the frame 1 adjacent which the sockets 3 are arranged. The ends of the conductor or resistance coil are attached to the inner ends of the binding posts 9, and the conductors 10 of the connecting cord 11 are attached to the outer ends of the binding posts 9 so as to be electrically connected to the resistance conductor or coil 8, the cord 11 having a plug 12 at its free end adapted to be threaded into a lamp socket whereby the heating unit may be supplied with electrical energy as usual.

A pair of longitudinal rods 13 are disposed at each side of the slab 6 and have their ends riveted or otherwise engaged to the ends of the frame 1, the rods 13 serving to space the toast and other objects from the resistance coil, as well as strengthening the frame 1 of the heating unit.

In order that the toast and other objects may be properly supported at the sides of the heating unit when it is in upright position, a pair of supporting bars 14 are pivoted, as at 15, between their ends to the outer side of that longitudinal piece of the frame 1 which has the binding posts 9 engaged therethrough, the bars 14 being disposed between the binding posts 9 and the ends of the frame. The bars 14 may be swung out of the way by swinging them longitudinally of the frame, and when the bars are swung at right angles with the frame, their end portions protrude beyond the sides of the frame, as seen in Figs. 3 and 4, for supporting the toast and utensils.

To assist the bars 14 in holding the toast and utensils against the sides of the heating unit, a pair of bails 16 arranged at the opposite sides of the heating unit have their ends inturned and pivotally engaged through the ends of the frame 1, as at 17, adjacent that longitudinal piece of the frame remote from the bars 14. The edges and the ends of the frame are provided with slots or notches 17ª for receiving the intermediate portions of the bails when the bails are swung against the sides of the heating unit, whereby the bails will not project from the sides of the heating unit when the device is folded. The arms of the bails are upon the outer sides of the ends of the frame, and the ends of the frame are provided with outstruck lugs or stops 18 adjacent the pivoted ends of the bails for limiting the outward movement of the bails, whereby when the bails are employed for holding the articles upon the sides of the heating unit, as seen in Fig. 3, they cannot accidentally swing upwardly to allow the articles to drop accidentally. The bails, however, are resilient in order that the arms may separate slightly to pass the lugs or stops 18 when the bails are forcibly swung upward, as this permits the bails to be swung upwardly above the heating unit to be used as handles for carrying or handling the heating unit in a convenient manner. That longitudinal piece having the binding posts 9 and bars 14 is the lowermost one when the heating unit is in an upright position, and the bails 16 normally hang from the ends of the frame 1 from points adjacent the upper longitudinal piece when the frame is vertical, so that the bails 16 will swing by gravity toward the frame for holding the toast or other articles against the sides of the heating unit.

The invention also embodies a rectangular heating oven 20 constructed of sheet metal and having a hinged door or cover 21, the oven 20 being slightly larger than the heating unit in order that it can receive the same. The ends of the oven are provided with straps 22 similar to the straps 2 and provided with the offset portions or sockets 23 for receiving the tongues 4 of the legs 5, as illustrated in Fig. 2, whereby the oven 20 can be supported in a horizontal position by the legs.

One side of the oven 20 is provided with slots 24 for receiving the spring catch tongues 19 of the upper longitudinal piece of the frame, a plurality of the tongues 19 projecting from each edge of the upper longitudinal piece of the frame, in order that the oven 20 may be applied to either side of the heating unit.

A frying pan or similar vessel 25 is adapted to fit within the oven 20, and is adapted to be seated upon the heating unit, as illustrated in Fig. 2, while a cooking vessel or similar utensil 26 is adapted to fit within the pan 25 and is also adapted to receive the heating unit, as suggested in Fig. 5, when the parts are nested together.

As above indicated, the heating unit can be readily supported in upright position, by the legs 5, and by swinging the bars 14 outwardly and raising the bails 16, slices of bread or other articles may be seated upon the bars 14, and then by releasing the bails they will swing downwardly for holding the bread or articles in place against the sides of the heating unit. The heating unit when in upright position provides admirable means for making toast, a piece of toast being indicated at 27 in Fig. 3.

The present appliance is of advantage for many reasons. The advantages of toasting bread at the sides of the upright heating unit are well known, since better results are obtained by this method. The cooking or boiling vessel 26 can be supported at one side of the heating unit, as suggested in Figs. 3 and 4, for boiling coffee, or the like, while toast is being made at the other side of the heating unit, or while the oven 20 is supported at the other side of the heating unit. When the vessel 26 is applied to the upright heating unit, the heat penetrates the respective upright side or wall of the vessel instead of the bottom thereof. In using the oven 20, it is seated upon the bars 14 and is swung against the side of the heating unit so that the respective tongues 19 pass through the slots 24 and engage the back or respective side of the oven for holding the oven in place removably. This oven can be used to hold the toast which has been made, so that the toast will be kept warm, or the oven may be employed for other obvious reasons. That side of the oven which is applied to the heating unit is preferably polished upon its outer surface to act as a reflector, in order that the heat rays will be reflected to some extent to the opposite side of the heating unit for assisting in the toasting or heating operation at the last mentioned side of the heating unit.

When a horizontal stove is desired or required, the legs 5 are applied to the oven 20, as seen in Fig. 2, to support the oven in a horizontal position, and the heating unit is then seated upon the oven, as seen in Fig. 2, or is slipped within the oven, whichever is desired. When the heating unit is placed upon the oven, the pan or other vessel 25 can be seated upon the heating unit. One side of the heating coil 8 will therefore heat the pan 25, while the other side of the coil will heat the oven 20. The oven 20 in being heated will warm or heat the food or edibles therein, and will also serve as a dead air space between the heating unit and the surface of the table or object upon which the stove is seated. When the heating unit is placed within the oven, the vessel or object to be heated is seated upon the oven.

When the device is not in use, the parts thereof may be nested within a small compass, as suggested in Fig. 5. The legs 5 are detached from the heating unit or oven, and when the bails are swung against the sides of the heating unit, the heating unit may be slipped into the vessel 26. The vessel 26 is then placed within the pan 25, and the pan 25 with the cord 11 and legs 5 are placed within the oven 20. The oven thus serves as a case for containing the other parts, whereby the device may be conveniently handled and stored.

Having thus described the invention, what is claimed as new is:

1. A heating unit comprising a rectangular sheet metal frame, an insulating slab disposed within the frame, the ends of the frame having instruck ears straddling and secured to the slab, the edges of the slab being spaced from the frame, and a resistance conductor wound around the slab.

2. An electric stove embodying a heating unit frame adapted to be supported in an upright position, a supporting member pivoted to the lower portion of the frame and adapted to be swung to project to opposite sides thereof for supporting articles at the opposite sides of the frame.

3. An electric stove embodying a heating unit frame adapted to be supported in an upright position, a supporting member pivoted to the lower portion of the frame and adapted to be swung to project to opposite sides thereof for supporting articles at the opposite sides of the frame, and means for holding the articles against the sides of the frame.

4. An electric stove embodying a heating unit frame adapted to be supported in an upright position, a supporting member pivoted to the lower portion of the frame and adapted to be swung to project to opposite sides thereof for supporting articles at the opposite sides of the frame, and bails terminally pivoted to the frame adjacent the upper portion thereof and adapted to swing downwardly toward the opposite sides of the frame for holding the articles thereagainst.

5. In an electric stove, a heating unit frame having spring catch tongues, and an oven having slots at one side for the reception and engagement of said tongues.

6. An electric stove embodying a heating unit, an oven, the oven being applicable to one side of the heating unit and the oven being adapted to support the heating unit, means for supporting the heating unit in an upright position and for supporting the oven in a horizontal position.

7. An electric stove embodying a heating unit, an oven, and supporting legs, the heating unit and oven each having means for the engagement of the legs whereby the heating unit can be supported in an upright position and whereby the oven can be supported in a horizontal position, the oven being applicable to the heating unit and being adapted to support the same.

8. An electric stove embodying a heating unit having a frame adapted to be supported in an upright position, and a bail terminally pivoted to the ends of said frame to swing downwardly toward one side of said heating unit for holding an article thereagainst, the ends of the frame having lugs past which the arms of the bail are movable whereby the lugs hold the bail when it is swung toward the heating unit.

In testimony that I claim the foregoing as my own, I have hereto affixed my signature in the presence of two witnesses.

THADDEUS N. SLOCUM.

Witnesses:
H. E. PALMETER,
G. A. ELZETT.